(12) United States Patent
Toda et al.

(10) Patent No.: US 6,663,268 B1
(45) Date of Patent: Dec. 16, 2003

(54) AUTOMATIC AUTOMOTIVE HEADLAMP LEVELING DEVICE

(75) Inventors: Atsushi Toda, Shizuoka (JP); Hideaki Takeuchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 29 days.

(21) Appl. No.: 09/705,111

(22) Filed: Nov. 2, 2000

(30) Foreign Application Priority Data

Nov. 5, 1999 (JP) .......................................... 11-314681

(51) Int. Cl.⁷ .............................. B60Q 1/00; F21V 21/28
(52) U.S. Cl. ...................... 362/464; 362/465; 362/466; 362/467; 362/468; 362/271; 362/272
(58) Field of Search ................................ 362/464–468, 362/272, 276, 271, 37, 286, 459, 460, 802, 530–532

(56) References Cited

U.S. PATENT DOCUMENTS 5,251,114 A * 10/1993 Cantin et al. ............... 362/272
5,877,680 A * 3/1999 Okuchi et al. ................ 315/82
5,907,196 A * 5/1999 Hayami et al. ............ 307/10.8
6,357,898 B1 * 3/2002 Toda et al. .................. 362/466

FOREIGN PATENT DOCUMENTS

| DE | 4019690 A1 | 6/1990 | ............ B60Q/1/10 |
| DE | 4311669 A1 | 4/1993 | ............ B60Q/1/10 |
| DE | 694 01792 T2 | 9/1994 | ............ B60Q/1/115 |
| DE | 19534870 A1 | 9/1995 | ............ B60Q/1/10 |
| DE | 19720314 A1 | 5/1997 | ............ B60Q/1/10 |
| DE | 19743670 A1 | 10/1997 | ............ B60Q/1/10 |
| DE | 19918404 A1 | 4/1999 | ............ G01B/7/15 |
| EP | 0825063 A2 | 2/1998 | ............ B60Q/1/115 |
| GB | 2309773 A | 8/1997 | ......... B60Q/1/1158 |
| GB | 2325757 A | 12/1998 | ........... B60Q/1/115 |

* cited by examiner

*Primary Examiner*—Sandra O'Shea
*Assistant Examiner*—Mark Tsidulko
(74) *Attorney, Agent, or Firm*—Fish & Richardson P.C.

(57) ABSTRACT

The invention provides an automatic automotive headlamp leveling device for providing a highly accurate optical axis correction by controlling the driving of an actuator without being affected by the mounting tolerance of a vehicle height sensor itself.

13 Claims, 8 Drawing Sheets

AUTOMATIC AUTOMOTIVE HEADLAMP LEVELING DEVICE

FIELD OF THE INVENTION

The present invention relates to an automatic automotive headlamp leveling device and more particularly to an automatic automotive headlamp leveling device for automatically adjusting the optical axes of the headlamps based on a pitch angle of the vehicle detected generally while the vehicle is not moving.

BACKGROUND OF THE INVENTION

In constructing a headlamp, a reflector in which a light source is securely inserted can be supported tiltably about a horizontal tilting axis relative to a lamp body. The optical axis of the reflector (headlamp) can be tilted about the horizontal tilting axis.

While the vehicle is stationary, a pitch angle of the vehicle may change relative to a reference position when a load is placed in or unloaded from the vehicle or when passengers get in or out of the vehicle. However, in most cases the vehicle lowers both at the front and rear. Because of this, a single vehicle height sensor of a one-sensor system is provided, for example, on a rear suspension to correlate the vehicle height (a vertical distance between a rear axle and the vehicle body) at the rear with the pitch angle of the vehicle. Thus, an approximate straight line, which comprises control data that correlate an output from the vehicle height sensor with the pitch angle of the vehicle, is obtained. The assumption associated with the line is that the front of the vehicle is also lowered. A pitch angle is then calculated based on an output from the vehicle height and the approximate straight line (control data).

As shown in FIG. 9, a conventional automatic automotive headlamp leveling device comprises the following: an actuator 102 for vertically tilting an optical axis L of a headlamp 100 relative to the vehicle body for adjustment, a vehicle height sensor 104 provided on a suspension on either the left or right rear wheel for detecting a distance between an axle and the vehicle body, and a control unit 106. Data from the vehicle height sensor 104 and pitch angles data of the vehicle reside in the control unit 106 as correlation functions (control data that are represented approximately as straight lines). The control data therein are used to calculate a pitch angle of the vehicle based on an output from the vehicle height sensor 104. The actuator 102 is controlled by an amount corresponding to the calculated pitch angle.

When A static load that acts on the vehicle is changed, the vehicle height sensor 104 detects and sends the change to the control unit 106. The control unit 106 calculates a vehicle pitch angle based on the correlation function that correlates vehicle height sensor outputs with vehicle pitch angles that are already entered and set in the unit 106. The unit 106 also drives the actuator 102 (tilts the optical axis about the horizontal tilting axis) by an amount corresponding to the calculated vehicle pitch angle and adjusts the optical axis L of the headlamp 100 such that the optical axis stays in a predetermined inclined or tilted angle relative to the road surface at all times.

In a two sensor system, a vehicle height sensor is provided on the front and rear suspensions, respectively. The control unit 106 calculates a vehicle pitch angle from $\Theta=\tan^{-1}(h/D)$, where $\Theta$ is the vehicle pitch angle, h (=H1−H2) is the difference between the output H1 from the front vehicle height sensor and the output H2 from the rear vehicle height sensor, and D is the distance corresponding to the wheel base of the vehicle.

With the conventional automatic headlamps leveling device described above, the vehicle pitch angle is set to 0 when only the driver is in the vehicle. Also the optical axis L is inclined to a predetermined angle relative to the road surface when the actuator 102 (a longitudinal driving member thereof) is positioned at a front-most end position P1. Since the vehicle pitch angle (the optical axis of the headlamp) changes upwardly only when the static load of the vehicle increases because of, for example, additional passengers, the optical axis of the headlamp only has to be tilted downwardly for adjustment. Therefore, the actuator (the longitudinal driving member thereof) is constructed to move only rearwardly where the front-most end position P1 is set as the initial position. The driving of the actuator is controlled on the assumption that the front-most end position P1 of the longitudinal stroke of the actuator coincides with the initial position P0 at which the vehicle pitch angle is 0. Note that reference numeral P2 denotes a rear-most end position of the longitudinal stroke of the actuator.

However, the front-most end position of the actuator may not necessarily match the initial position P0 because of vehicle assembling error, mounting error of the vehicle height sensor on the suspension, or output voltage-related error of the vehicle height sensor itself (hereinafter, these errors are referred to in general as the mounting errors of a vehicle height sensor or the like). If the optical axis L is adjusted to a proper position L0 by tilting the reflector using the aiming mechanism 108, the assembling error of the mounting errors of the vehicle height sensor or the like can be corrected. However, offer errors such as errors associated with the mounting of vehicle height sensor to the suspension or the output voltage-related error of the vehicle height sensor itself (hereinafter, referred to as the mounting tolerance of the vehicle height sensor itself) remain uncorrected.

FIG. 10 shows a case where the signal voltage of the vehicle height sensor is offset in a direction in which the optical axis is raised (V1→V0) because of the mounting tolerance of the vehicle height sensor. The same figure shows the optical axis position at which the vehicle pitch angle is zero (0) when only the driver is in the vehicle. This position corresponds to a position P0, which is further ahead of the front-most end position P1 of the longitudinal stroke of the actuator. Even if the optical axis is adjusted to the proper position L0 using the aiming mechanism 108, the positional relationship between the front-most end position P1 of the longitudinal stroke of the actuator and the initial position P0 of the vehicle pitch angle $\Theta$ remains unchanged. The issue of the mounting tolerance of the vehicle height sensor itself still exists. Therefore, between signal voltages V0 and V1 of the vehicle height sensor, the optical axis always constitutes a dead zone corresponding to the front-most position P1 of the actuator, preventing the proper leveling of the headlamp.

The actuator is constructed such that it operates only in the direction in which the optical axis is lowered. However, since the front-most end position P1 of the longitudinal stroke of the actuator is not properly set (the front-most end position P1 of the longitudinal stroke of the actuator does not coincide with the initial position P0) when the rear of the vehicle is lowered, a dead zone is produced while signal voltages V0 to V1 of the vehicle height sensor are outputted. Thus, the pulling-in operation of the actuator is interrupted. Because of this, an operation of lowering the optical axis is started after the optical axis is tilted upward by an angle $\Delta\Theta'$ corresponding to the mounting tolerance of the vehicle height sensor, which is an angle corresponding to the signal voltages V0 to V1 of the vehicle height sensor. Hence, the driver of a on-coming vehicle may suffer from glaring lights.

The present invention was made in view of the problem described above. An object of the present invention is to provide an automatic automotive headlamp leveling device for enabling a highly accurate optical axis correction by controlling the driving of an actuator without being affected by the mounting tolerance of the vehicle height sensor.

SUMMARY OF THE INVENTION

To attain the above object, according to a first embodiment of the invention, there is provided an automatic automotive headlamp leveling device comprising headlamps optical axes adapted to tilt vertically relative to a body of a vehicle by driving actuators, a vehicle height sensor provided on a suspension of the vehicle for detecting a vertical distance between an axle and the body, and an arithmetic control unit for calculating a vehicle pitch angle corresponding to an output from the vehicle height sensor based on a predetermined expression and for controlling the driving of the actuators based on the calculated pitch angle. The actuators are each constructed to operate only in a direction in which the optical axes are lowered from a front-most end position or rear-most end position of a longitudinal stroke of the actuators in which the vehicle pitch angle is zero (0) with the optical axes being in a predetermined inclined state relative to a road surface.

The control unit is operated on the assumption that initial positions of the actuators are positions that are offset from the front-most end positions or rear-most end positions of the longitudinal strokes of the actuators by at least an amount of stroke corresponding to a maximum mounting tolerance in a direction in which the optical axes are lowered. The control unit further subtracts an output corresponding to the offset value from an output from the vehicle height sensor, calculates a vehicle pitch angle corresponding to the offset subtracted output based on the predetermined expression, and controls the driving of the actuators relative to the assumed initial positions based on the pitch angle calculated as corresponding to the offset subtracted output.

The control unit can comprise an ECU, which is an integration of a CPU, a RAM and a ROM. In a one-sensor system in which a vehicle height sensor is provided on a rear suspension, the vehicle pitch angle $\Theta$ and the output H from the vehicle height sensor can be approximated by a control line, which is a first-order line expressed as $\Theta=\Theta o-kH$, where $\Theta o$ is a maximum pitch angle of the vehicle body, and k is a constant. The relational expression (a control line) is entered and set as an expression in the control unit.

Additionally, in a two-sensor system in which vehicle height sensors are provided on both the front suspension and the rear suspension, respectively, the vehicle pitch angle $\Theta$ is expressed as $\tan \Theta = h/D$, where an output from the front vehicle height sensor is H1, an output from the rear vehicle height sensor is H2, a difference between the outputs from the two sensors is h (=h1−H2), and the wheel base is D. This relational expression is entered and set as an expression in the control unit.

In addition, the maximum mounting tolerance of the vehicle sensor can be obtained from experience, and an offset amount of the initial position of the actuator (the assumed initial position of the actuator) and an output from the vehicle height sensor corresponding to the offset amount can be determined.

The control unit is constructed to assume an initial position of the longitudinal stroke of the actuator a position that is offset from the front-most end position or rear-most end position of the longitudinal stroke of the actuator in a direction in which the optical axis is lowered by at least an amount of stroke corresponding to the maximum mounting tolerance of the vehicle height sensor. Additionally, the arithmetic control unit subtracts an output corresponding to the offset value from an output from the vehicle height sensor, calculates a vehicle pitch angle corresponding to an offset subtracted output based on a predetermined expression and controls the driving of the actuator relative to the assumed initial position based on the pitch angle corresponding to the offset subtracted output.

When the vehicle pitch angle changes because, for example, a passenger steps into the vehicle (vehicle body), the vehicle sensor detects this change. Then, the control unit calculates a vehicle pitch angle corresponding to an output from the vehicle height sensor based on the predetermined expression and controls the driving of the actuator such that the pitch angle is cancelled or that the axis of the headlamp is maintained at a predetermined angle relative to the road surface at all times.

In particular, the control unit is configured to assume a position offset from the front-most end position or rear-most end position of the longitudinal stroke of the actuator by at least an amount of the stroke corresponding to the maximum mounting tolerance of the vehicle height sensor in the direction in which the optical axis is lowered as the initial position of the longitudinal stroke of the actuator. The control unit obtains a vehicle height sensor output from which the mounting tolerance of the vehicle height sensor is removed (H−ΔH) (which excludes the mounting tolerance) by subtracting a vehicle height sensor output (ΔH) corresponding to the offset amount of the actuator initial position from an output (H) detected by the vehicle height sensor. Following this, the arithmetic control unit calculates a vehicle pitch angle corresponding to the vehicle height sensor output from which the mounting tolerance is removed (H−ΔH) by using an expression $\Theta=\Theta o-kH$ for the one-sensor system or by using an expression $\Theta=\tan-1(h/D)$ for the two-sensor system, respectively. That is, the control unit calculates the vehicle pitch angle based on a control line (broken B) expressed as $\Theta=\Theta o-k(H-\Delta H)$ instead of a control line shown in FIG. 3 expressed as $\Theta=\Theta o-kh$ (solid line A) for the one-sensor system or calculates the pitch angle based on an expression $\Theta=\tan^{-1}((h-\Delta h)/D)$ for the two-sensor system. Then, the control unit controls the actuator such that the actuator tilts the optical axis relative to the initial position by an amount corresponding to the pitch angle from which the mounting tolerance is removed.

For example, assume that the initial position of the actuator is located at a position offset from the front-most end position P1 of the longitudinal stroke of the actuator shown in FIG. 10 by an amount of the stroke corresponding to the maximum mounting tolerance of the vehicle sensor in the direction in which the optical axis is lowered, and also assume that this initial position is shown by reference numeral P0' in FIG. 10. Furthermore, assume that an output from the vehicle height sensor then is V0'. If the signal voltage of the vehicle height sensor is offset by $\Delta V(=V1-V0)$ in a direction in which the optical axis is raised because of the mounting tolerance, an output voltage can be offset by $\Delta V'(=V0'-V1)$ in an opposite direction to the offset direction of the signal voltage because of the mounting tolerance, i.e., in the direction in which the optical axis is lowered. Then, since $\Delta V'>\Delta V$, the output from the vehicle height is transmitted in terms of a position behind the front-most end position P1 of the actuator. Even if the vehicle height sensor signal voltages are between V0 and V1, which fall on the dead zone, the actuator can operate to withdraw without any delay because the output can be detected between V1 and V0', thereby eliminating the risk of generating any glare.

According to a second embodiment of the invention, there is provided an automatic automotive headlamp leveling device comprising headlamps optical axes adapted to tilt vertically relative to a body of a vehicle by driving actuators, a vehicle height sensor provided on a suspension of the vehicle for detecting a vertical distance between an axle and the body, and an control unit for calculating a vehicle pitch angle corresponding to an output from the vehicle height sensor based on a predetermined expression and controlling the driving of the actuators based on the calculated pitch angle. The actuators are each constructed to operate only in a direction in which the optical axes are lowered from a front-most end position or rear-most end position of a longitudinal stroke of the actuators in which the vehicle pitch angle is zero with the optical axes being in a predetermined inclined state relative to a road surface. The control unit is operated on the assumption that positions that are offset from the front-most end positions or rear-most end positions of the longitudinal strokes of the actuators by at least an amount of stroke corresponding to a maximum mounting tolerance in a direction in which the optical axes are lowered as initial positions of the actuators. The control unit further adds a pitch angle corresponding to the offset value to the vehicle pitch angle calculated based on the predetermined expression and controls the driving of the actuators relative to the assumed initial positions based on the offset value added pitch angle.

According to the second embodiment of the invention, the control unit is constructed to assume as the initial positions of the actuators the positions that are offset by at least an amount of the stroke corresponding to the maximum mounting tolerance of the vehicle height sensor from the front-most end positions or rear-most end positions of the longitudinal strokes of the actuator.

The control unit calculates the vehicle pitch angle corresponding to an output H from the vehicle height sensor including the mounting tolerance of the vehicle height sensor from the expression $\Theta = \Theta_o - kH$ for the one-sensor system and from the expression $\Theta = \tan^{-1}(h/D)$ for the two-sensor system. Obtained from the result of the operation (the pitch angle including the mounting tolerance) is a vehicle pitch angle from which the mounting tolerance is removed (not including the mounting tolerance) $(\Theta + \Delta\Theta)$ by adding a vehicle pitch angle $\Delta\Theta$ corresponding to the offset amount of the actuator initial position (FIG. 3). To tilt the optical axis by an amount corresponding to the vehicle pitch angle from which the mounting tolerance is removed $(\Theta + \Delta\Theta)$, the driving of the actuator is controlled relative to the assumed initial position.

In addition, according to a third embodiment of the invention, an automatic automotive headlamp leveling device as set forth in the first or second embodiment of the invention is provided such that the optical axes of the headlamps are constructed to be tilted for adjustment with an aiming mechanism, and the offset amount of the assumed initial position is set to be equal to an amount of the stroke corresponding to a maximum mounting tolerance.

If the optical axes of the headlamps deviate from proper positions at the front-most end position or rear-most end position of the longitudinal stroke of the actuator, the optical axes can be tilted for adjustment to the proper positions with the aiming mechanism.

Additionally, since the offset amount of the assumed initial position of the actuator is limited to the amount of stroke 6 corresponding to the maximum mounting tolerance of the vehicle height (FIG. 2), as shown in FIG. 10, an area corresponding to the automatic headlamps leveling in the longitudinal stroke P1 to P2 of the actuator is an area P0' to P2. Thus, the reduction in area corresponding to the automatic headlamps leveling is kept limited (the stroke amount corresponding to the maximum mounting tolerance of the vehicle height sensor), and therefore, the reduction in automatic headlamps leveling range can be suppressed to that extent.

According to a fourth embodiment of the invention, an automatic automotive headlamp leveling device as set forth in any of the embodiments 1 to 3 is provided such that the automatic leveling device comprises vehicle speed detecting means, acceleration detecting means and stable running time detecting means. The control unit controls the driving of the actuators while the vehicle is stationary or while the vehicle is running stably where the speed of the vehicle is equal to or faster than a predetermined value and the acceleration thereof is equal to or lower than a predetermined value for a predetermined period of time continuously. The control unit also calculates a vehicle pitch angle corresponding to an output from the vehicle height sensor detected during the stable running to control the driving of the actuators based on the calculated vehicle pitch angle.

The automatic headlamps leveling sometime may have to be carried out under an unsuitable condition such as when a vehicle is parked partially on a curb. However, an improper leveling of this type can be corrected because the vehicle pitch angle can be calculated easily when the vehicle is running stably to produce constant vehicle height sensor outputs. The vehicle pitch angle is calculated from the vehicle height sensor output, and the driving of the actuator is controlled based on the vehicle pitch angle.

DETAILED DESCRIPTION OF THE INVENTION

Next, a mode for carrying out the invention will be described below based on embodiments thereof.

Figure 1:
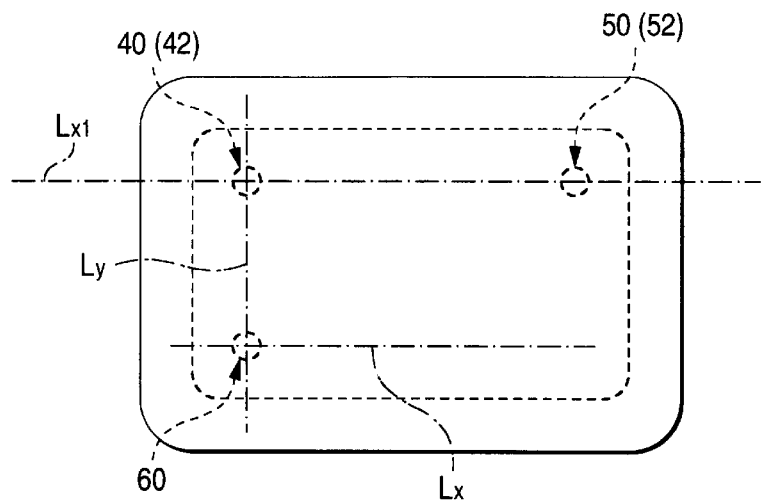
FIG. 1 is a front view of a headlamp of an automotive vehicle to which an automatic headlamp leveling according to a first embodiment of the invention is applied.
Figure 2:
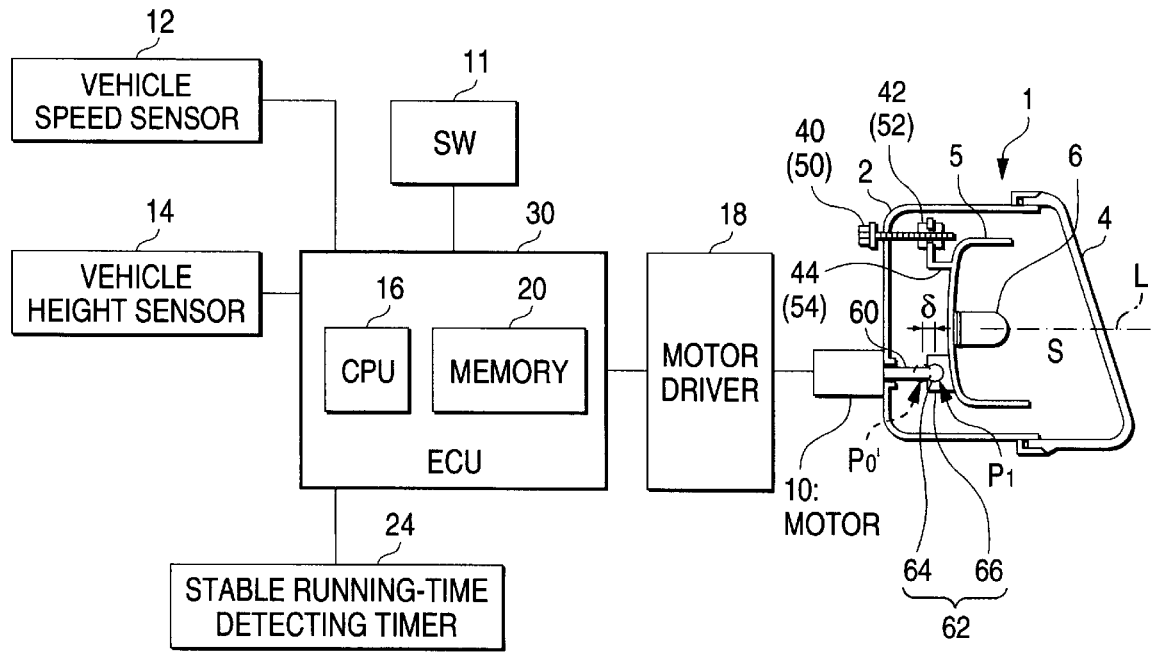
FIG. 2 is a diagram showing the overall construction of the automatic headlamp leveling device of the first embodiment.
Figure 3:
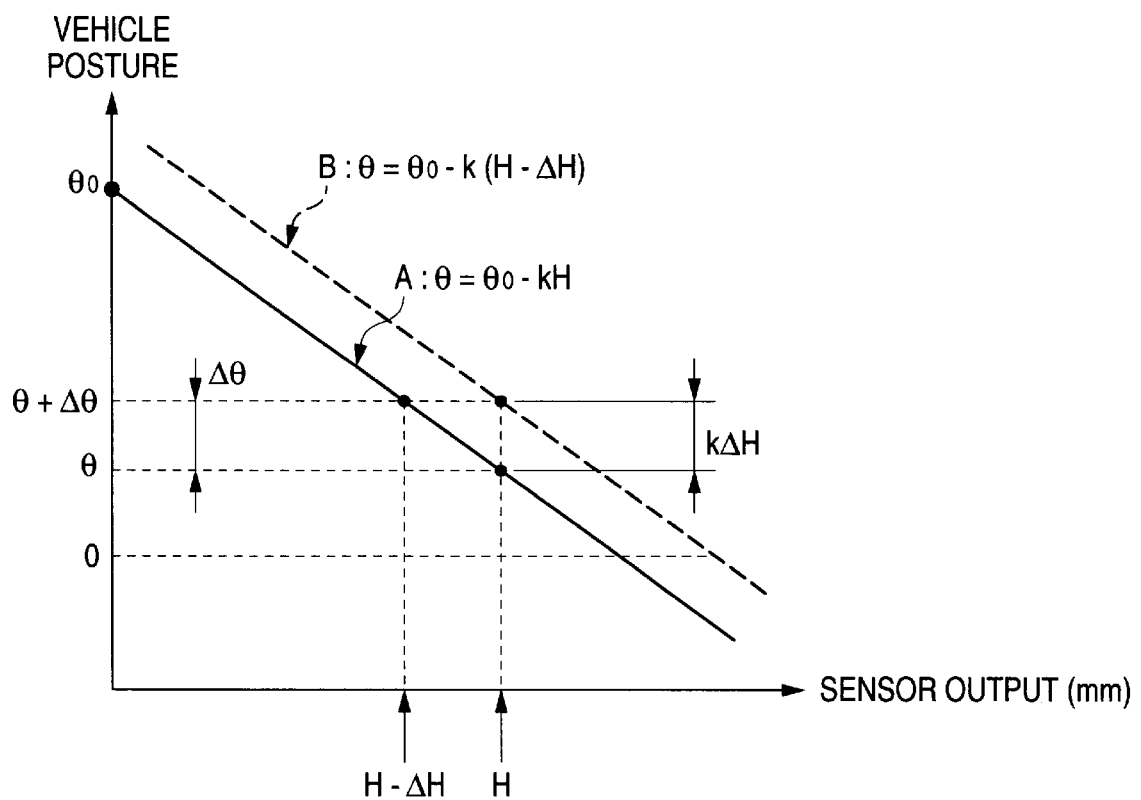
FIG. 3A is a diagram showing the correlation between outputs from a vehicle height sensor and postures of a vehicle.
FIG. 3B is a diagram showing the relationship between a vehicle pitch angle and an output from the vehicle height sensor.
Figure 3:
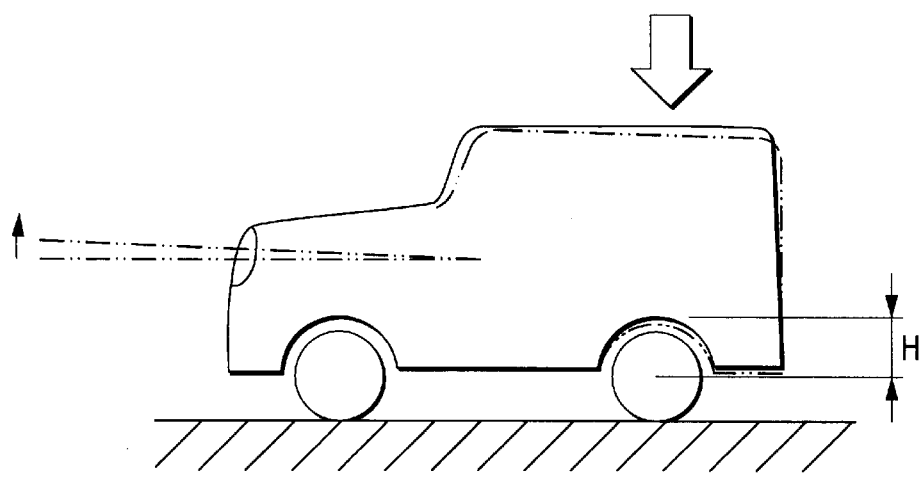
Figure 4:
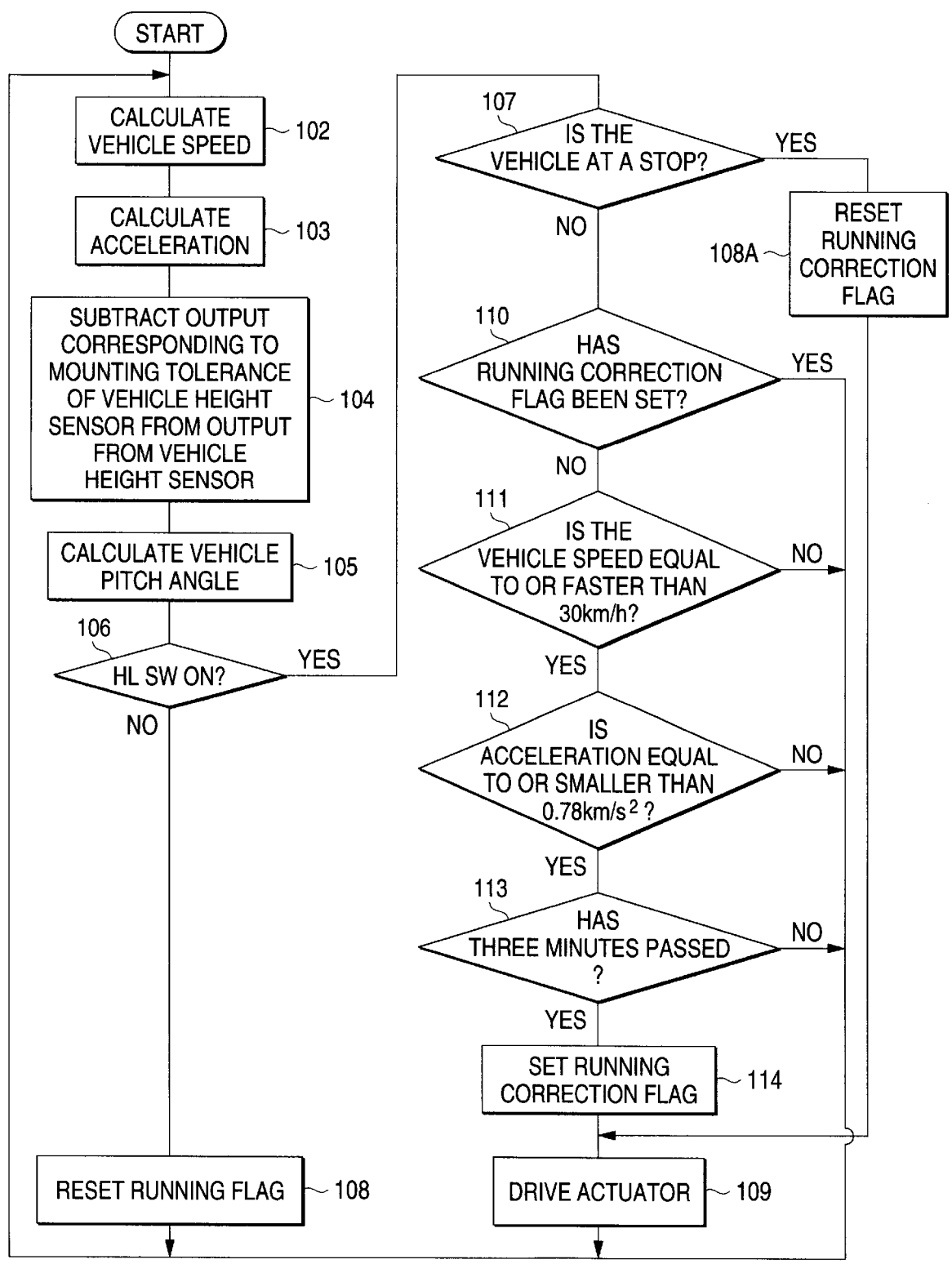
FIG. 4 is a flowchart showing the flow of a process of controlling the driving of a motor by a CPU.

FIGS. 1 to 4 show an embodiment of the invention. FIG. 1 is a front view of an automotive headlamp to which an automatic headlamp leveling device according to a first embodiment of the invention is applied. FIG. 2 is a diagram showing the overall construction of the automatic headlamp leveling device. FIG. 3A is a correlation diagram between outputs from a vehicle height sensor and postures of a vehicle (vehicle pitch angles). FIG. 3B is a correlation diagram between vehicle pitch angles and outputs (vehicle height) from the vehicle height sensor. FIG. 4 is a flowchart showing the process flow of a motor driving control by a CPU that is a control part of the automatic headlamp leveling device.

In FIGS. 1 and 2, an automotive headlamp 1 has a front lens 4 assembled to a front opening of a lamp body 2 to form a lamp chamber S. In the lamp chamber S, a parabolic reflector 5 having a bulb 6 as a light source securely inserted thereinto is supported such that the reflector 5 can be tilted for adjustment about a horizontal tilting axis Lx and a vertical tilting axis Ly by means of a aiming mechanism E. The reflector 5 is also constructed to tilt for adjustment about a horizontal tilting axis $Lx_1$ by a longitudinal sliding shaft 60 that is driven by a motor, an actuator.

The aiming mechanism E comprises a pair of left and right aiming screws 40, 50 which extend forward and are rotatably supported on the lamp body 2, nut members 42, 52 mounted, respectively, on brackets 44, 54 extending from the reflector 5 and into which the aiming screws 40, 50 are screw fitted, respectively, and a ball joint 62 (a ball portion 64 at a front end portion of the longitudinal sliding shaft 601 and a ball receiving portion 66 on the reflector 5 side) provided between the front end portion of the longitudinal sliding shaft 60 and the reflector 5. Thus, the reflector 5 can be tilted for adjustment about the vertical tilting axis Ly connecting the nut member 42 and the ball joint 62 by rotating the aiming screw 50. Additionally, the reflector 5 can also be tilted for adjustment about the horizontal tilting axis Lx passing through the ball joint 62 by rotating the aiming screws 40, 50. The optical axis L can be tilted for adjustment vertically and horizontally.

Further, the automatic leveling device for the headlamp 1 comprises a motor 10 that functions as an actuator for tilting for adjustment the optical axis L of the headlamp 1 vertically and horizontally and the longitudinal sliding shaft 60, a lighting switch 11 for the headlamp 1, a vehicle speed sensor 12 which is a vehicle speed detecting means for detecting the speed of a vehicle, a vehicle height sensor 14 provided on a rear suspension and constituting a part of a vehicle pitch angle (a longitudinal pitch angle of the vehicle) detecting means, and a CPU 16. The CPU 16 is a control part for determining whether the headlamp 1 is turned on or off, for determining whether the vehicle runs or stops based on a signal from the vehicle speed sensor 12, for calculating a vehicle pitch angle based on a signal from the vehicle height sensor 14 and control data entered and set in a storage part 20, and for sending to a motor driver 18 a control signal for driving the motor 10 based on a vehicle pitch angle so calculated. The storage part 20 stores vehicle pitch angles detected by the vehicle sensor 14 and calculated by the CPU 16 and specifies a correlation between an output from the vehicle height sensor 14 and the vehicle pitch angle.

The actuator is constructed such that the longitudinal sliding shaft 60 operates through the driving of the motor 10 from a front-most end position P1 which is a maximum protruded position only in a withdrawing direction (a direction in which the optical axis of the headlamp is lowered). The optical axis of the headlamp is adjusted so as to be located at a proper position (a position where the vehicle pitch angle is zero) by the aiming mechanism E when there is only the driver in the vehicle, but since the actuator includes the mounting tolerance of the vehicle height sensor, an actual position of the front-most end portion P1 of the longitudinal stroke of the actuator is situated somewhere between the front-most end portion of the longitudinal stroke of the actuator and a position Po' set back (offset in the direction in which the optical axis is lowered) by a stroke δ corresponding to the maximum mounting tolerance of the vehicle height sensor.

In addition, the storage part 20 is constituted by a RAM for storing various types of data, a ROM for storing control programs and a backup ROM, and the CPU 16 and the storage part 20 are integrated into an ECU (Electronic Control Unit) which is not only an input/output circuit but also a logic arithmetic circuit unit.

When a signal (a vehicle speed) is sent from the vehicle sensor 12 to the CPU 16, the CPU 16 determines whether the vehicle is stationary or running based on the signal so received. Only while the vehicle is stationary, the CPU 16 drives the motor 10 at certain intervals.

The vehicle height sensor 14 outputs a signal voltage corresponding to a vertical distance (a vehicle height) between the axle and the vehicle body. As shown in FIG. 3B, the vehicle pitch angle (an upward displacement amount of the optical axis which is a longitudinal inclination of the vehicle height) is designed to increase as the vertical distance H (vehicle height) between the axle and the vehicle body decreases in conjunction with the lowering at the rear of the vehicle resulting from the increase in the number of passengers riding in the vehicle as shown by an imaginary line in FIG. 3. Then, when a signal from the vehicle height 14 is sent to the CPU 16, the CPU lo calculates a longitudinal inclination (a vehicle pitch angle) from the entered signal, which corresponds to the vertical distance (vehicle height) between the axle and the vehicle body.

The correlation between the output (mm) from the vehicle height sensor 14 and the vehicle pitch angle (degree) or the vehicle posture is entered and set in the storage part 20 as a mode (in which the smaller (larger) the output (vehicle height) from the vehicle height sensor, the larger (smaller) the vehicle pitch angle becomes) specified by a control line A (an approximate straight line) shown in FIG. 3A. The control line A is a first order line ($\Theta=\Theta o-kH$) which shows how the output H (mm) from the vehicle height sensor 14 and the vehicle pitch angle $\Theta$ (degree) vary, using as a reference a position where the vehicle pitch angle is maximum ($\Theta o$) when the output from the vehicle height sensor is zero.

As shown in FIG. 2, the CPU 16 is constructed to operate on the assumption that the position Po' as an initial position of the longitudinal stroke is offset from the front-most end position P1 of the longitudinal stroke of the actuator by an stroke δ. The CPU 16 also controls the driving of the actuator relative to the initial position. The stroke δ corresponds to the maximum mounting tolerance of the vehicle height sensor in the direction in which the optical axis is lowered.

In addition, as shown in FIG. 3, the CPU 16 is designed to obtain a vehicle height sensor output from which the mounting tolerance of the vehicle height sensor is removed (H−ΔH) (excluding the mounting tolerance) by subtracting the vehicle height sensor output (ΔH) corresponding to the offset amount of the initial position of the actuator from the output (H) detected by the vehicle height sensor 14. It is also designed to calculate a vehicle pitch angle Θ corresponding to the mounting tolerance subtracted vehicle height sensor output (H−ΔH) based on the expression Θ=Θo−kH. (the control line A) and to control the driving of the motor 10 by the calculated pitch angle which corresponds to the mounting tolerance subtracted output relative to the assumed initial position Po' of the actuator.

Note that instead of the control line A, an expression (a control line B) Θ=Θo−k(H−ΔH) which takes the vehicle height sensor output (ΔH) corresponding to the offset amount of the initial position of the actuator into consideration may be stored in the storage part 20. Thus, the vehicle pitch angle Θ corresponding to the output H of the vehicle height sensor can be calculated based on the control line B.

In addition, the CPU 16 determines whether the lighting switch 11 is turned ON or OFF, and sends an output to the motor driver 18 to drive the motor 10 only when the lighting switch 11 is turned ON.

Further, the CPU 16 is constructed to perform also the headlamp leveling (optical axis correction) only once while the vehicle is running but it only does so when the vehicle is running in a stable fashion.

While the CPU 16 controls the driving of the actuator 10 based on the pitch angle data calculated from the output from the vehicle height sensor 14 when the vehicle is at a halt, the headlamp may be leveled (optical axis correction) based on the pitch angle data taken while the vehicle is parked improperly such where the vehicle is at a stop along a slope or is partially parked on a curb.

To address this improper optical axis correction, the CPU 16 can be arranged to control the driving of the actuator once only during the vehicle is running stably based on a pitch angle calculated from an output from the vehicle height sensor during the stable period. Generally, a vehicle on an irregular road surface having, for example, dips and bumps, cannot run at a speed more than 30 km/h. Also, normally, its acceleration should not be more than 0.78 m/s2 to avoid drastic acceleration or deceleration that changes the posture of the vehicle. Therefore, for a vehicle to be stable for leveling its headlamps, the vehicle speed should not be less than 30 km/h and at the same time the acceleration should not be more than 0.78 m/s2 for at least three seconds. The vehicle pitch angle is calculated when the above requirement is met. This eliminates abnormal values detected when the vehicle is being affected by abnormal conditions. To determine whether the stable running condition has lasted for at least three seconds, the CPU 16 counts the time by using a stable running time detecting timer 24, which is activated when the vehicle speed is not less than 30 km/h and the acceleration is not more than 0.78 m/s2.

If the pitch angle data taken while the vehicle is at a stop is proper (if the vehicle is not parked along a slope or partially on a curb), then the pitch angle data taken during a stable running condition is substantially equal to that taken while the vehicle is at a stop. Therefore, the position of the optical axis of the headlamp after a headlamp leveling has been carried out based on the pitch angle data taken during the stable running period is substantially equal to the position of the optical axis of the headlamp that had last been adjusted while the vehicle was at a stop.

Next, the control of the driving of the motor 10 by the CPU 16, which is a control part, will be described, referring to a flowchart shown in FIG. 4.

In Step 102, the vehicle speed is calculated from an output from the vehicle sensor 12, and the calculated speed is stored in the storage part 20. In Step 103, an acceleration is calculated from a difference between the vehicle speed obtained in Step 102 and the last vehicle speed stored in the storage part 20, and the calculated acceleration is stored in the storage part 20.

In Step 104, a tolerance subtracted vehicle height sensor output (H−ΔH) from which an output ΔH corresponding to the maximum mounting tolerance of the vehicle height sensor is subtracted from an output H from the vehicle height sensor 14. In Step 105, a vehicle pitch angle Θ corresponding to the tolerance subtracted vehicle height sensor output (H−ΔH) is calculated based on the control line A corresponding to a correlation between the vehicle height sensor output and the vehicle pitch angle. If the control line stored in the storage part 20 is not the control line A but the control line B, Step 104 is not needed. Therefore, in step 105, a vehicle pitch angle corresponding to the vehicle height sensor output H is calculated based on the control line (the expression Θ=Θo−k(H−ΔH).

In Step 106, whether or not the headlamp is illuminated is determined from an output from the lighting switch 11. If the headlamp is being illuminated, the process advances to Step 109, but if not, a running flag is reset in Step 108, and thereafter the process returns to Step 102.

In Step 107, whether or not the vehicle is at a stop is determined from an output from the vehicle speed sensor 12. If the vehicle is at a stop, in Step 108A, a running correction is re-flagged and thereafter, the process advances to Step 109, where a signal is sent to the motor driver 18 for driving the motor a predetermined amount. On the other hand, in Step 107, if the vehicle is determined to be in motion, whether or not the running correction flag is reset is determined in Step 110. In Step 110, if the running correction flag is not reset, or the optical axis has not yet been corrected since the vehicle has started to move, the process moves to Step 111.

In Step 111, whether or not the vehicle speed is equal to or greater than the reference value (30 km/h) is determined, and if it is, the process flows to Step 112 where whether or not the acceleration is equal to or smaller than the reference value (0.78 m/s2) is determined. In Step 112, if it is equal to or smaller than 0.78 m/s2, the process flows to Step 113 where the stable running detection timer 24 is run. In Step 113, whether or not the vehicle speed is 30 km/h or more and the acceleration is 0.78 m/s2 or less for at least three (3) seconds is determined.

Then, in Step 113, if the vehicle speed is 30 km/h or more and the acceleration is 0.78 m/s2 or less for at least three (3) seconds, the count of the stable running detection timer 24 is cleared. Then, in Step 114, after the running correction flag is set, the process moves to Step 109, where a signal is sent to the motor driver 18 for driving the motor 10 a predetermined amount. Thus, even if the automatic headlamp is leveled improperly based on an improper pitch angle resulting from, for example, the vehicle parked partially on a curb, the leveling can be corrected.

In addition, the process returns to Step 102 without driving the motor 10 if the running correction is flagged (i.e. the optical axis has been corrected during running or the automatic headlamp leveling has been carried out), or if the vehicle speed is below the reference value of 30 km/h or the acceleration exceeds the reference value of 0.78 m/s2 in Steps 111, 112, respectively, or if the vehicle speed is equal to or greater than the reference value of 30 km/h and the acceleration is equal to or less than the reference value of 0.78 m/s2 but this condition does not last for at least three (3) seconds.

Figure 5:
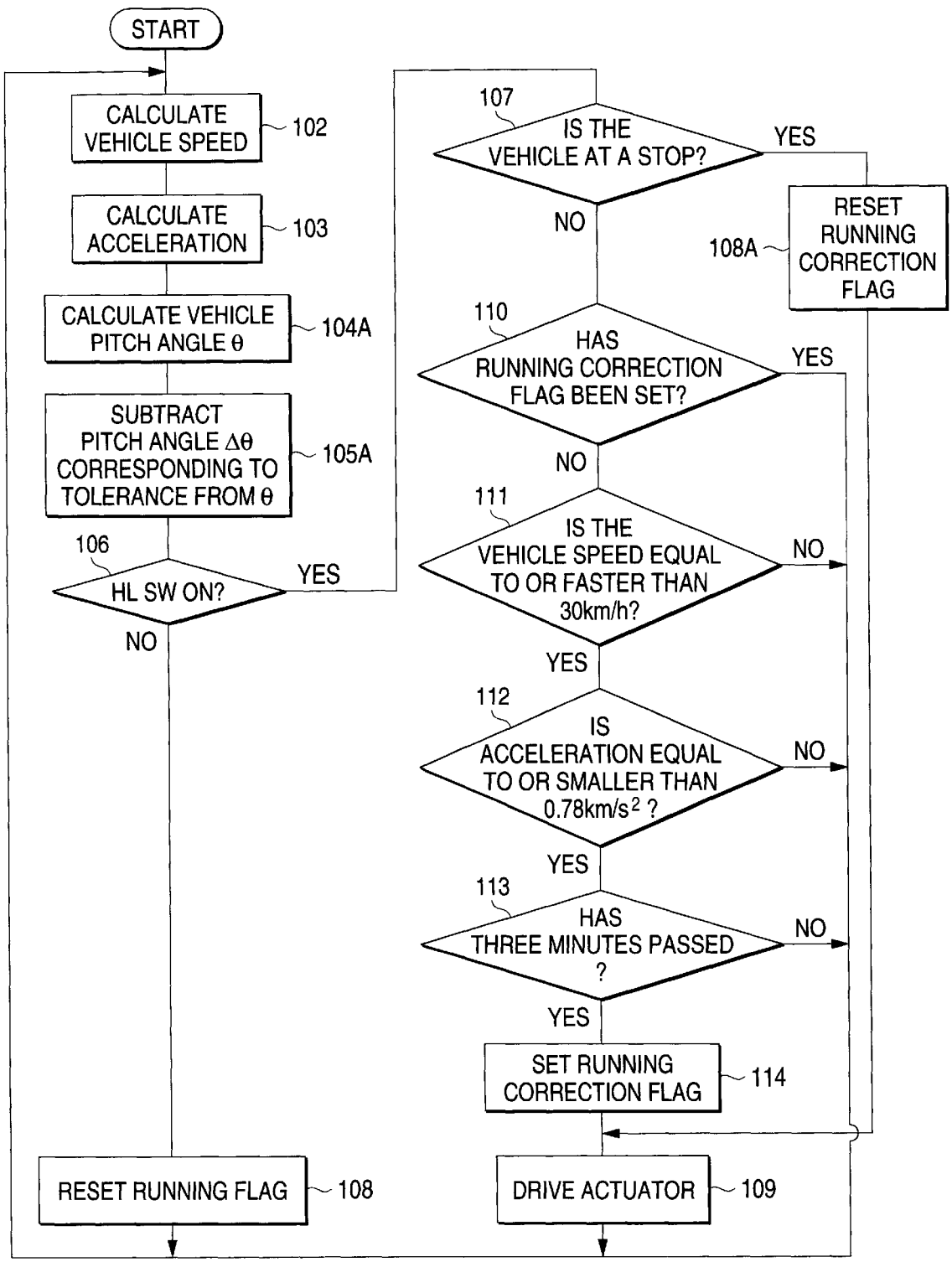
FIG. 5 is a flowchart showing the flow of a process of controlling a motor by a CPU that is a control part of an automatic headlamp leveling device according to a second embodiment of the invention.

FIG. 5 shows a second embodiment of the invention and illustrates a flowchart of a CPU, which is a control part of an automatic automotive headlamp leveling device according to the second embodiment.

In the first embodiment described above, the CPU 16 is arranged first to subtracts the output corresponding to the maximum mounting tolerance of the vehicle height sensor from the output from the vehicle height sensor 14 and thereafter to calculate the vehicle pitch angle corresponding to the mounting tolerance subtracted vehicle height sensor output based on the control line A stored in the storage part 20. In the second embodiment, as shown in FIG. 3, the CPU 16 is arranged first to calculate a vehicle pitch angle $\Theta$ corresponding to an output from a vehicle height sensor 14 from a control line A stored in a storage part 20 and thereafter to obtain a vehicle pitch angle from which amounting tolerance is removed ($\Theta+\Delta\Theta$) (which does not include the mounting tolerance) from the result (the calculated vehicle pitch angle $\Delta\Theta$ of the above calculation by adding thereto a pitch angle $\Delta\Theta$ corresponding to the mounting tolerance.

The flowchart of the second embodiment is different from that of the first embodiment mainly in that steps 104A and 105A are used for steps 104, 105 to deal with the aforesaid different configuration. The remaining part of the former embodiment remains the same as the latter embodiment. Therefore, only the different steps will be described below with like reference numerals being given to like components. in Step 104A, a vehicle pitch angle $\Theta$ corresponding to an output from the vehicle height sensor 14 from the control line A stored in the storage part 20 which corresponds to the correlation of vehicle height sensor outputs/ vehicle pitch angles is calculated. Then, in Step 105A, a pitch angle $\Delta\Theta$ corresponding to the maximum mounting tolerance of the vehicle height sensor 14 is added to the vehicle pitch angle $\Delta\Theta$ obtained in Step 104A, and this vehicle pitch angle ($\Theta+\Delta\Theta$) including the vehicle pitch angle corresponding to the maximum mounting tolerance is then stored in the storage part 20.

Figure 6:
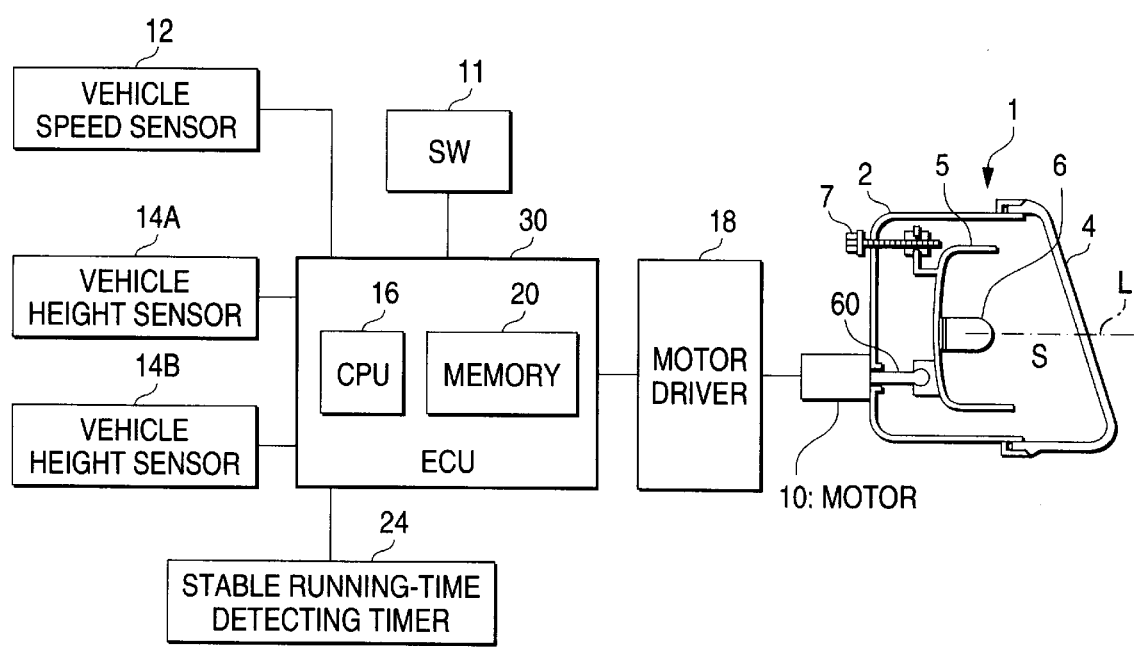
FIG. 6 is a diagram showing the overall construction of an automatic automotive headlamp leveling device according to a third embodiment of the invention.
Figure 7:
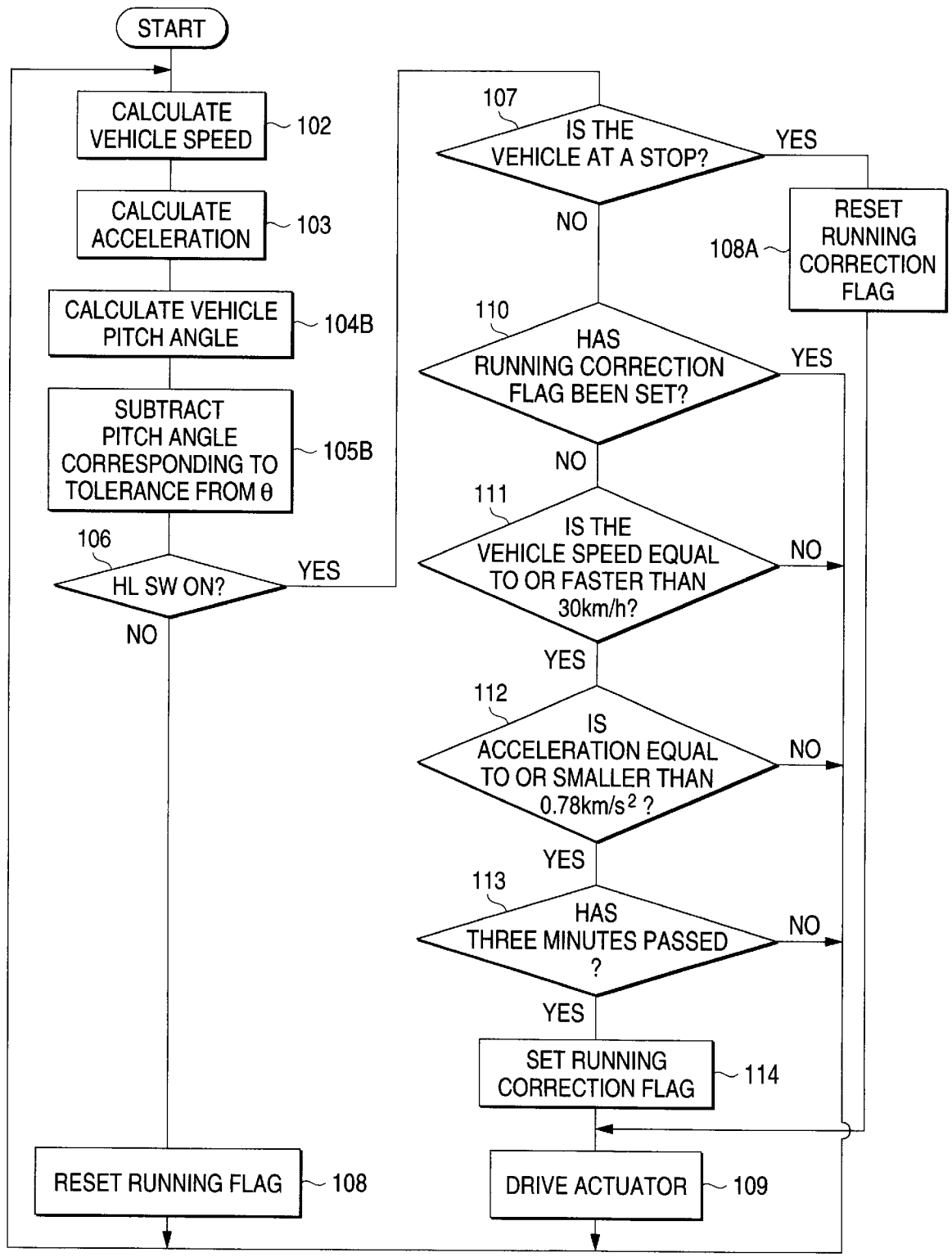
FIG. 7 s a flowchart showing the flow of a process of controlling a motor by a CPU.

FIGS. 6, 7 show a third embodiment of the invention, in which FIG. 6 is a diagram showing the overall construction of an automatic automotive headlamp leveling device according to the third embodiment and FIG. 7 shows a flowchart of a CPU which is a control part of the automatic leveling device.

The first and second embodiments described previously are constructed such that only the single vehicle height sensor 14 is mounted on the rear suspension, and that the approximate straight line corresponding to the correlation between the outputs from the vehicle height sensor and the vehicle pitch angles is stored as the control line A. Thus, a vehicle pitch angle corresponding to an output from the vehicle height sensor is calculated. However, the third embodiment is constructed such that vehicle height sensors 14A, 14B are provided on a front suspension and a rear suspension, respectively, and that an expression $\Theta=\tan^{-1}(h/D)$ is entered and set in a storage part 20, where $\Theta$ is a vehicle pitch angle, H1 an output from the front vehicle height sensor, H2 an output from the rear vehicle height sensor, h(=H1−H2) a difference between outputs from the two sensors and D a wheel base of the vehicle. Using the expression, a CPU 16 calculates a vehicle pitch angle corresponding to a difference in output between the two vehicle height sensors h(=H1−H2).

The process flow of the third embodiment differs from that of the second embodiment mainly in that steps 104B and 105B replace steps 104A, 105A of the latter embodiment to deal with the different configuration described above. The remaining part of the flowchart of the third embodiment remains the same as that of the flowchart of the second embodiment. Therefore, the description of the remaining part of the embodiment will be omitted with like reference numerals being given to like components.

Specifically, in Step 104B, a vehicle pitch angle $\Theta$ corresponding to a difference h(=H1−H2) in output between the two vehicle height sensors 14A, 14B is calculated from the expression $\Theta=\tan^{-1}(h/D)$. Then, in Step 105B, a pitch angle $\Delta\Theta$ corresponding to an average maximum mounting tolerance of the two vehicle heights sensors 14A, 14B is added to the vehicle pitch angle $\Theta$, and the vehicle pitch angle including the added mounting tolerance($\Theta+\Delta\Theta$) is stored in the storage part 20.

The others remain identical with the previous embodiments, and like reference numerals are associated with like components.

In the previous embodiments, the vehicle speed of 30 km/h or greater, the acceleration of 0.78 m2 or less and the continuation of such a condition for three seconds or longer constitute the requirements for the stable running condition, but the invention is not limited thereto.

Figure 8:
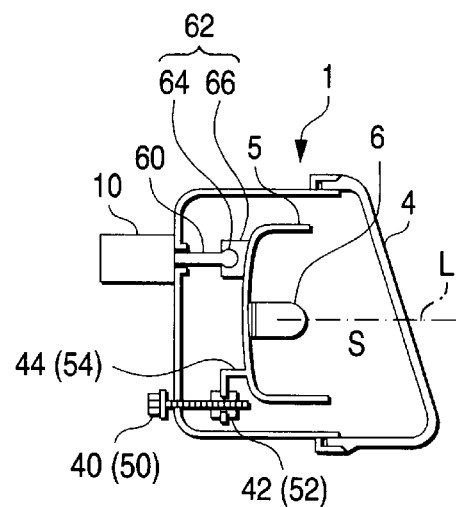
FIG. 8 is a vertical sectional view of a headlamp constituting a main part of another embodiment of the invention.
Figure 9:
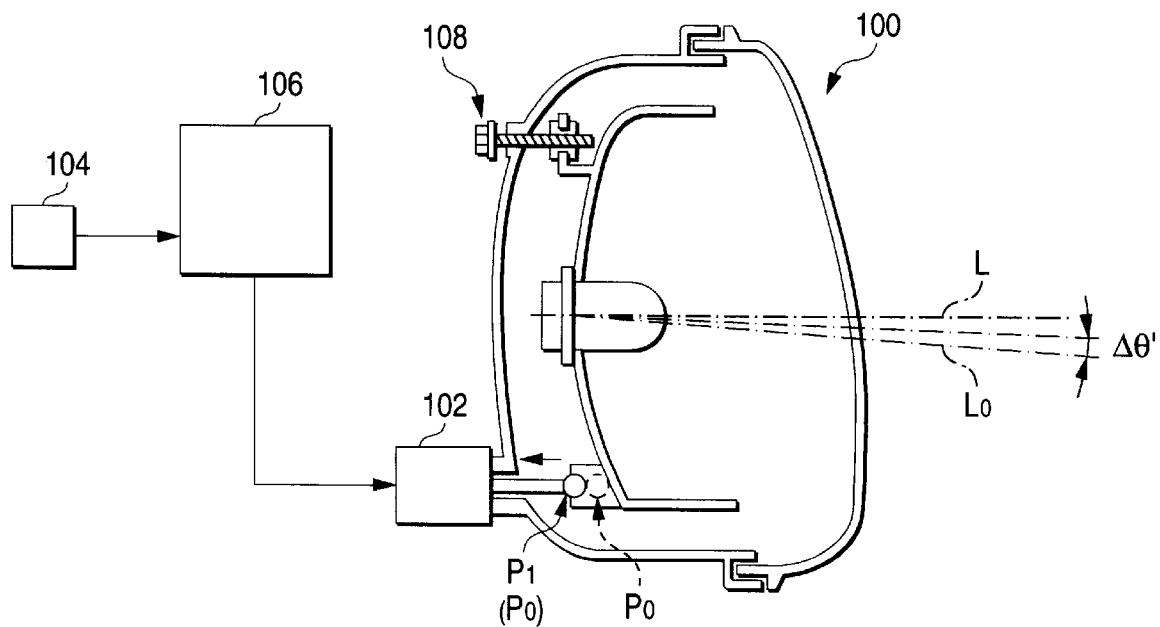
FIG. 9 is a diagram showing the overall construction or a conventional automatic headlamp leveling.
Figure 10:
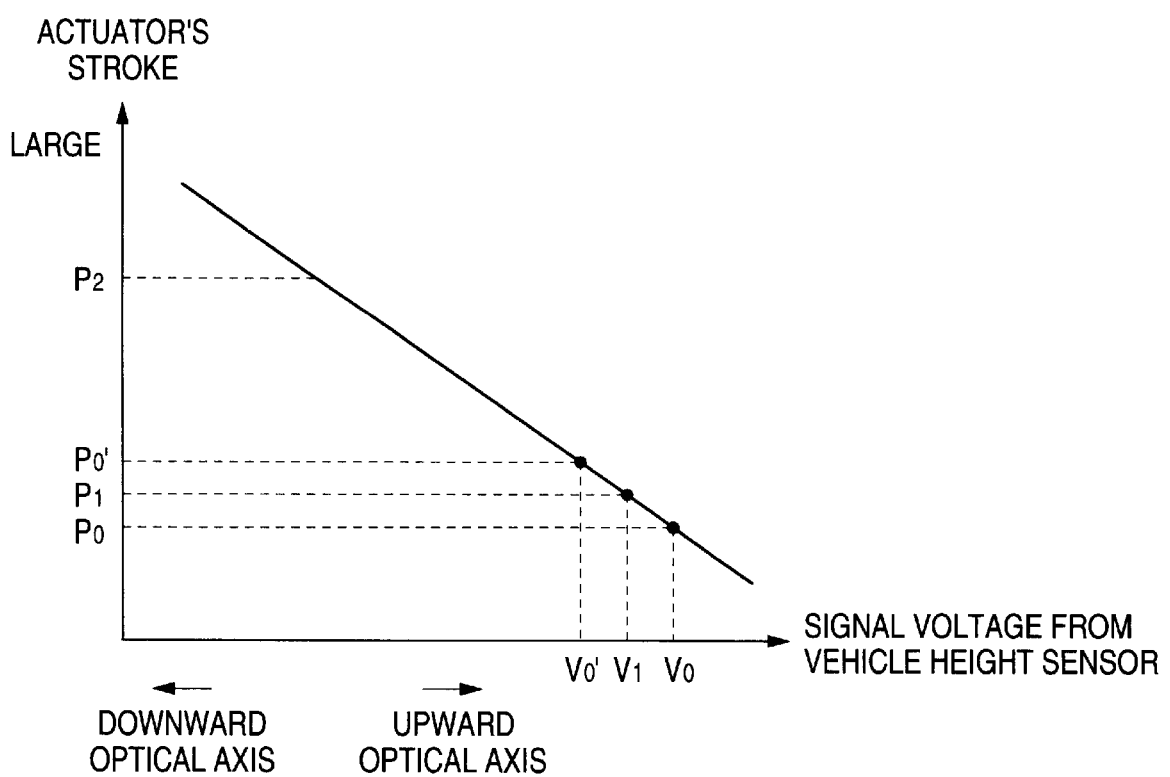
FIG. 10 is a diagram explaining an effect of the mounting tolerance of a vehicle height sensor on the vehicle height sensor output/actuator stroke characteristics.

Additionally, in the previous embodiments, the actuator (the motor 10) is interposed between the lower position of the lamp body 2 and the lower position of the reflector 5. The leveling of the headlamp is constructed by advancing the longitudinal sliding shaft 60 of the actuator (causing it to protrude) from the rear-most end position thereof. As shown in FIG. 8, however, an actuator (a motor 10) may be interposed between an upper position of a lamp body 2 and an upper position of a reflector 5 and a longitudinal sliding shaft 60 of the actuator may be advanced (caused to protrude) from a rear-most end position thereof so that the leveling of a headlamp is implemented. In this case, it is desirable to let an initial position of the actuator be displaced from the rear-most end position of the actuator in a direction in which the optical axis of the headlamp is lowered, or at a position which is offset forward by a predetermined distance from the rear-most end position of the actuator.

Furthermore, while in the above embodiments, the initial position of the actuator is designed to be offset by the stroke corresponding to the maximum mounting tolerance of the vehicle height sensor, the offset amount may be equal to or greater than the stroke corresponding to the maximum mounting tolerance of the vehicle height sensor. However, as the offset amount increases, the length of the sliding stroke of the actuator becomes short which can be utilized to control the optical axis of the headlamp, and therefore, it is desirable that the offset amount is set to be equal to a stroke corresponding to the maximum mounting tolerance of the vehicle height sensor.

Moreover, in the previous embodiments, while the automatic leveling of the reflector moving-type headlamp is described in which the reflector 5 is provided to tilt relative to the lamp body 2 fixed to the vehicle body, the embodiment can equally be applied to a unit moving-type headlamp in which a lamp body/reflector unit is provided to tilt relative to a lamp housing fixed to the vehicle body.

As is clear from the above descriptions, according to the first embodiment of the invention, since there is formed no dead zone because of the mounting tolerance of the vehicle height sensor in controlling the driving of the actuator, there is no risk of glaring lights being projected against oncoming vehicles. This makes it possible to level the automatic headlamp with a high degree of accuracy.

According to the second embodiment of the invention, since there is formed no dead zone because of the mounting tolerance of the vehicle height sensor in controlling the driving of the actuator, there is no risk of glaring lights being projected against oncoming vehicles, making it possible to provide a highly accurate automatic headlamp leveling device.

According to the third embodiment of the invention, if the optical axis position constituting the reference to the automatic headlamp deviates from a proper position, the optical axis can be set to a predetermined proper position with the aiming mechanism. Thus, the proper automatic headlamp leveling can be secured at all times.

In addition, since the offset amount of the initially set position of the actuator corresponds to the stroke amount corresponding to the maximum mounting tolerance of the vehicle height sensor, this narrows the range of the automatic headlamp leveling only by a slight angle. Thus, there is no risk of deteriorating the visibility of the driver.

According to the fourth embodiment of the invention, although it is assumed that the headlamp should be automatically leveled while the vehicle is at a stop, if the headlamp is leveled while the vehicle is partially parked on a curb, such an improper automatic headlamp leveling can be properly rectified later.

According to the fifth embodiment of the invention, since the control unit is integrated into the ECU, the device is made simple in construction, and the mounting thereof to the vehicle body can be facilitated.

The present invention claims priority from Japanese patent application serial no. H11-314681, which is incorporated herein by this reference in its entirety.

Several embodiments of the invention have been described herein, but it should be understood that various additions and modifications could be made which fall within the scope of the following claims.

What is claimed is:

1. An automatic automotive headlamp leveling device comprising:
   actuators for vertically tilting optical axes of a headlamp relative to the body of a vehicle;
   a height sensor provided on a suspension of said vehicle for detecting a vertical distance between an axle and said body;
   a control unit for calculating a vehicle pitch angle corresponding to an output from said vehicle height sensor based on a predetermined expression and controlling the driving of said actuators based on said calculated pitch angle;
   wherein said actuators are each constructed so as to operate only in a direction in which said optical axes are lowered from a front-most end position or rear-most end position of a longitudinal stroke of said actuators in which the vehicle pitch angle is zero with said optical axes being in a predetermined inclined state relative to a road surface;
   said control unit is arranged to assume positions that are offset from said front-most end positions or rear-most end positions of said longitudinal strokes of said actuators by at least an amount of stroke corresponding to a maximum mounting tolerance in a direction in which said optical axes are lowered as initial positions of said actuators; and
   said control unit further subtracts an output corresponding to said offset value from an output from said vehicle height sensor, calculates a vehicle pitch angle corresponding to said offset value subtracted output based on said predetermined expression and controls the driving of said actuators relative to said assumed initial positions based on said pitch angle calculated as corresponding to said offset value subtracted output.

2. An automatic automotive headlamp leveling device comprising:
   actuators for vertically tilting optical axes relative to the body of a vehicle;
   a vehicle height sensor provided on a suspension of said vehicle for detecting a vertical distance between an axle and said body; and
   a control unit for calculating a vehicle pitch angle corresponding to an output from said vehicle height sensor based on a predetermined expression and controlling the driving of said actuators based on said calculated pitch angle; wherein
   said actuators are arranged to operate only in a direction in which said optical axes are lowered from a front-most end position or rear-most end position of a longitudinal stroke of said actuators in which the vehicle pitch angle is zero with said optical axes being in a predetermined inclined state relative to a road surface;
   said control unit is arranged to assume positions that are offset from said front-most end position or rear-most end position of said longitudinal strokes of said actuators by at least an amount of stroke corresponding to a maximum mounting tolerance in a direction in which said optical axes are lowered as initial positions of said actuators; and
   said arithmetic control further adds a pitch angle corresponding to said offset value to said vehicle pitch angle calculated based on said predetermined expression and controls the driving of said actuators relative to said assumed initial positions based on said offset value added pitch angle.

3. An automatic automotive headlamp leveling device as set forth in claim 1, wherein said optical axes of said headlamps are constructed to be tilted for adjustment with an aiming mechanism, and wherein the offset amount of said assumed initial positions is set to be equal to said stroke amount corresponding to a maximum mounting tolerance.

4. An automatic automotive headlamp leveling device as set forth in claim 2, wherein said optical axes of said headlamps are constructed to be tilted for adjustment with an aiming mechanism, and wherein the offset amount of said assumed initial positions is set to be equal to said stroke amount corresponding to a maximum mounting tolerance.

5. An automatic automotive headlamp leveling device as set forth in claim 1 further comprising:
   vehicle speed detecting means;
   acceleration detecting means; and
   stable running time detecting means; and
   wherein said control unit controls said actuators when the vehicle is stationary or when the vehicle is running stably with the speed of the vehicle being not less than a predetermined value and the acceleration of the vehicle being not more than a predetermined value at least for a predetermined period of time, calculates a vehicle pitch angle corresponding to an output from said vehicle height sensor to control the driving of said actuators based on said calculated vehicle pitch angle.

6. An automatic automotive headlamp leveling device as set forth in claim 2 further comprising:
   vehicle speed detecting means;
   acceleration detecting means; and
   stable running time detecting means; and
   wherein said control unit controls said actuators when the vehicle is stationary or when the vehicle is running stably with the speed of the vehicle being not less than a predetermined value and the acceleration of the vehicle being not more than a predetermined value at least for a predetermined period of time, calculates a vehicle pitch angle corresponding to an output from said vehicle height sensor to control the driving of said actuators based on said calculated vehicle pitch angle.

7. An automatic automotive headlamp leveling device as set forth in claim 1, wherein said control unit comprises an ECU, which is an integration of a CPU, a RAM and a ROM.

8. An automatic automotive headlamp leveling device as set forth in claim 2, wherein said control unit comprises an ECU, which is an integration of a CPU, a RAM and a ROM.

9. An automatic automotive headlamp leveling device comprising:
   a reflector having a light source;
   an actuator having a movable shaft connected to said reflector for vertically tilting said reflector relative to the body of a vehicle;
   a height sensor provided on a suspension of said vehicle for detecting a vertical distance between an axle and said body; and
   a control unit for calculating a vehicle pitch angle corresponding to an output from said vehicle height sensor based on a predetermined expression and controlling said actuators based on said calculated pitch angle;
   wherein said control unit is arranged to operate said actuator by assuming to have the shaft of said actuator offset by a value corresponding to a maximum mounting tolerance of the height sensor.

10. The leveling device of claim 9, wherein said control unit further subtracts an output corresponding to the maximum mounting tolerance from an output corresponding to said predetermined offset value from an output from said height sensor, calculates a vehicle pitch angle corresponding to said offset subtracted output based on said predetermined expression and controls the actuator based on said pitch angle.

11. An automatic automotive headlamp leveling device comprising:
   actuators for vertically tilting optical axes of a headlamp relative to a body of a vehicle;
   a height sensor provided on a suspension of said vehicle for detecting a vertical distance between an axle and said body;
   a control unit for calculating a vehicle pitch angle corresponding to an output from said vehicle height sensor and controlling the driving of said actuators based on said calculated pitch angle; and
   stable running time detecting means, wherein
      said control unit controls said actuators when the vehicle is stationary or when the vehicle is running stably at least for a predetermined period of time detected by said stable running time detecting means, and said actuators are each constructed so as to operate only in a direction in which said optical axes are lowered from a front-most end position or rear-most end position of a longitudinal stroke of said actuators in which the vehicle pitch angle is zero with said optical axes being in a predetermined inclined state relative to a road surface.

12. An automatic automotive headlamp leveling device as set forth in claim 11, wherein said control unit is arranged to assume positions that are offset from said front-most ends positions or rear-most end positions of said longitudinal strokes of said actuators by at least an amount of stroke corresponding to a maximum mounting tolerance in a direction in which said optical axes are lowered as initial positions of said actuators.

13. An automatic automotive headlamp leveling device as set forth in claim 12, wherein said control unit subtracts an output corresponding to said offset value from an output from said vehicle height sensor, calculates a vehicle pitch angle corresponding to said offset value subtracted output based on said predetermined expression and controls the driving of said actuators relative to said assumed initial positions based on said pitch angle calculated as corresponding to said offset value subtracted output.

* * * * *